US005971552A

United States Patent [19]

O'Farrell et al.

[11] Patent Number: 5,971,552

[45] Date of Patent: *Oct. 26, 1999

[54] VEHICLE GLOBAL POSITIONING SYSTEM

[75] Inventors: Desmond J. O'Farrell; Roger L. Veldman; Kenneth Schofield, all of Holland, Mich.

[73] Assignee: Donnelly Corporation, Holland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,851

[22] Filed: Dec. 8, 1995

[51] Int. Cl.[6] .................................................... G02B 7/182

[52] U.S. Cl. .......................... 359/871; 359/872; 359/874; 359/877; 359/604

[58] Field of Search .................................... 359/871, 872, 359/874, 877, 604

[56] References Cited

U.S. PATENT DOCUMENTS

| | | | |
|---|---|---|---|
| 2,161,777 | 6/1939 | Sarnes | 343/712 |
| 2,528,590 | 11/1950 | Garlow | 343/720 |
| 2,586,643 | 2/1952 | Garlow | 177/329 |
| 2,836,818 | 5/1958 | DeVirgilis | 343/720 |
| 2,964,746 | 12/1960 | Trudnak, Jr. et al. | 343/713 |
| 3,090,960 | 5/1963 | Ingledew | 343/906 |
| 3,099,797 | 7/1963 | Piccinini | 325/312 |
| 3,188,641 | 6/1965 | Gergely | 343/715 |
| 3,736,591 | 5/1973 | Rennels et al. | 343/702 |
| 3,939,423 | 2/1976 | Zakharov et al. | 325/312 |
| 4,123,756 | 10/1978 | Nagata et al. | 343/702 |
| 4,210,357 | 7/1980 | Adachi | 296/84 |
| 4,760,394 | 7/1988 | Takeuchi et al. | 340/825.54 |
| 4,868,915 | 9/1989 | Anderson, III et al. | 340/825.31 |
| 4,873,530 | 10/1989 | Takeuchi et al. | 343/711 |
| 5,073,012 | 12/1991 | Lynam | 359/604 |
| 5,210,540 | 5/1993 | Masumoto | 342/357 |
| 5,257,195 | 10/1993 | Hirata | 364/449 |
| 5,311,368 | 5/1994 | Tsuyama | 359/877 |
| 5,402,134 | 3/1995 | Miller et al. | 343/742 |
| 5,442,340 | 8/1995 | Dykema | 340/825.22 |
| 5,475,366 | 12/1995 | Van Lente et al. | 340/525 |
| 5,475,395 | 12/1995 | Nakamura et al. | 343/720 |
| 5,479,155 | 12/1995 | Zeinstra et al. | 340/825.22 |
| 5,497,306 | 3/1996 | Pastrick | 362/83.1 |
| 5,504,478 | 4/1996 | Knapp | 340/825.69 |

*Primary Examiner*—Cassandra Spyrou
*Assistant Examiner*—Mohammad Y. Sikder
*Attorney, Agent, or Firm*—Van Dyke, Gardner, Linn & Burkhart, LLP

[57] ABSTRACT

A vehicle global positioning system includes a mirror assembly having a reflective element and a housing for the reflective element that is made from a material that is electrically substantially non-conducting. The system further includes a global positioning system (GPS) receiver and control module and at least one receiving antenna. The vehicle GPS is adapted to receive earth satellite signals with the receiving antenna and to convert the signals to location, velocity and/or time parameters. The GPS receiving antenna is positioned within the housing of the mirror assembly. In a preferred embodiment, the GPS receiving antenna is positioned within the housing of a vehicle exterior mirror. The vehicle GPS may include a plurality of GPS receiving antennas, such as one located in the vehicle's driver side exterior mirror and the other located in the vehicle's passenger side exterior mirror.

27 Claims, 5 Drawing Sheets

VEHICLE GLOBAL POSITIONING SYSTEM

BACKGROUND OF THE INVENTION

This invention relates generally to electronic systems for vehicles and, more particularly, to global positioning systems for vehicles.

The Global Positioning System (GPS) is a satellite-based radio navigation system capable of providing continuous position, velocity, and time information to an unlimited number of users throughout the world. The global positioning system includes a satellite constellation in orbit around the earth. The satellites transmit orbit data. By measuring the ranges from the satellites to a low cost global positioning system receiver, the three-dimensional location of the receiver can be accurately located, provided that the signals from a plurality of satellites, typically four or more satellites, can be received.

Applications of global positioning system in vehicles, such as automobiles, trucks, vans, sport utility vehicles, minivans, and the like, have been developed. Examples of present applications of the global positioning system to vehicles include automatic navigation systems for driver assistance in route guidance, intelligent vehicle highway systems for road tolling and traffic flow assessment and route diversions, as well as automatic vehicle location systems for monitoring a vehicle's position and movement which is provided to a fleet control center.

A global positioning system receiver includes one or more receiving antennas and an electronic system which converts the satellite signals received by the antenna to information pertaining to the location of the vehicle, as well as auxiliary information, such as precise time measurement. One difficulty with application of the global positioning system to vehicles is positioning of the receiving antenna or antennas. In order to precisely receive the signals transmitted by the satellites, a clear line of sight must be provided between the antenna and the satellite without blockage by intervening electrically conductive materials, such as metals. One solution has been to mount a separate casing to the roof of the vehicle with the antenna in the casing. While such solution provides a clear line of sight to the global positioning system satellites in a hemisphere around the antenna, this mounting technique results in a protrusion from the vehicle, which is visually distractive and aerodynamically disturbing. Additionally, means must be provided to attach the casing to the vehicle body, which must either penetrate the vehicle's sheet metal exterior surface or adhere to the exterior surface. Another solution that has been proposed is to form the upper portion of the vehicle passenger compartment roof of a non-conductive material, with the receiving antenna positioned under the electrically non-conductive roof. Such extensive modification to the vehicle would not readily be commercially acceptable to automobile manufacturers and would preclude any simple retrofit of existing vehicles. Locations in most other parts of the vehicle are precluded by extensive use of metal in the vehicle, which results in a cage effect, wherein the areas are significantly surrounded by electrically conductive metal.

Accordingly, a need exists to find a manner of mounting a receiving antenna of a global positioning system receiver that would hide the antenna from observation in order to avoid distracting from the appearance of the vehicle and to avoid tipping off thieves to the presence of the receiving antenna and the global positioning system receiver. Such mounting technique should additionally provide for ease of accommodation of the receiving antenna without significant modification to the vehicle or its internal structure. Furthermore, the mounting must be achieved in a manner which accommodates the functionality of the receiving antenna by providing a clear line of sight, free from any cage effect, to a sufficient number of transmitting global positioning system satellites in order to carry out the purpose of the application.

SUMMARY OF THE INVENTION

The present invention provides a vehicle global positioning system in which an exterior mirror assembly is provided including a reflective element and a housing for the reflective element. The housing is made from a material that is electrically substantially non-conducting. A global positioning system receiver is provided having at least one receiving antenna. The global positioning system receiver receives earth satellite signals with the receiving antenna and converts the signals into one or more parameters, including, for example, location, velocity and/or time parameters. Advantageously, the receiving antenna is positioned within the mirror assembly housing.

The invention is based upon the recognition that the housing of an exterior mirror assembly provides an ideal location for such receiving antenna. This recognition includes the fact that the housing is substantially electrically non-conductive and, therefore, is, in effect, a radome. Additionally, an exterior mirror assembly has evolved from a substantially mechanical device to an electronic assembly, which is serviced by electrical leads which extends through a wireway to the vehicle. For example, electro-optic mirrors are becoming more common. In such mirrors, an electrical signal applied to the mirror element drives the reflectivity of the mirror element to a partial reflectance level in order to reduce glare from trailing vehicles. A preferred form of such electro-optic mirror is an electrochromic mirror, which receives a low voltage signal from a drive circuit and produces a continuously variable partial reflectance level in response to such signal. Additionally, the mirror assembly may include a heater, in heat transfer association with the reflective element, and a motorized positioning device for selectively positioning the reflective element in the housing. Such electrically operated devices are common in exterior vehicle mirrors. The existence of electrical service to an exterior rearview mirror assembly facilitates placement of the global positioning system receiving antenna in the housing because electrical connections of the global positioning system may be accommodated through the existing electrical wireway presently provided to the mirror assembly.

The present invention includes positioning the global positioning system receiving antenna within the housing of an exterior rearview mirror. Such exterior rearview mirror housing is positioned external of the metal enclosure of the vehicle and, thereby, substantially avoids the cage effect of the vehicle body. Furthermore, the receiving antenna is completely enclosed within the mirror housing and is, thereby, sheltered from environmental elements and is not observable to either distract from the aesthetic appearance of the vehicle or to alert a thief to the presence of the global positioning system application. Additionally, it is commonplace to have two exterior rearview mirrors on opposite sides of the vehicle. Thereby, any reduction in the line of sight of a receiving antenna in one rearview mirror housing may be conveniently overcome by a combined field of view of receiving antennas in the two exterior mirror assemblies on opposite sides of the vehicle. Thus, the present invention encompasses a plurality of mirror assembly mounted receiving antennas for a global positioning system application.

These and other objects, advantages, and features of this invention will become apparent upon review of the following specification in conjunction with the drawings.

DESCRIPTION OF THE PREFERRED EMBODIMENT

Figure 1:
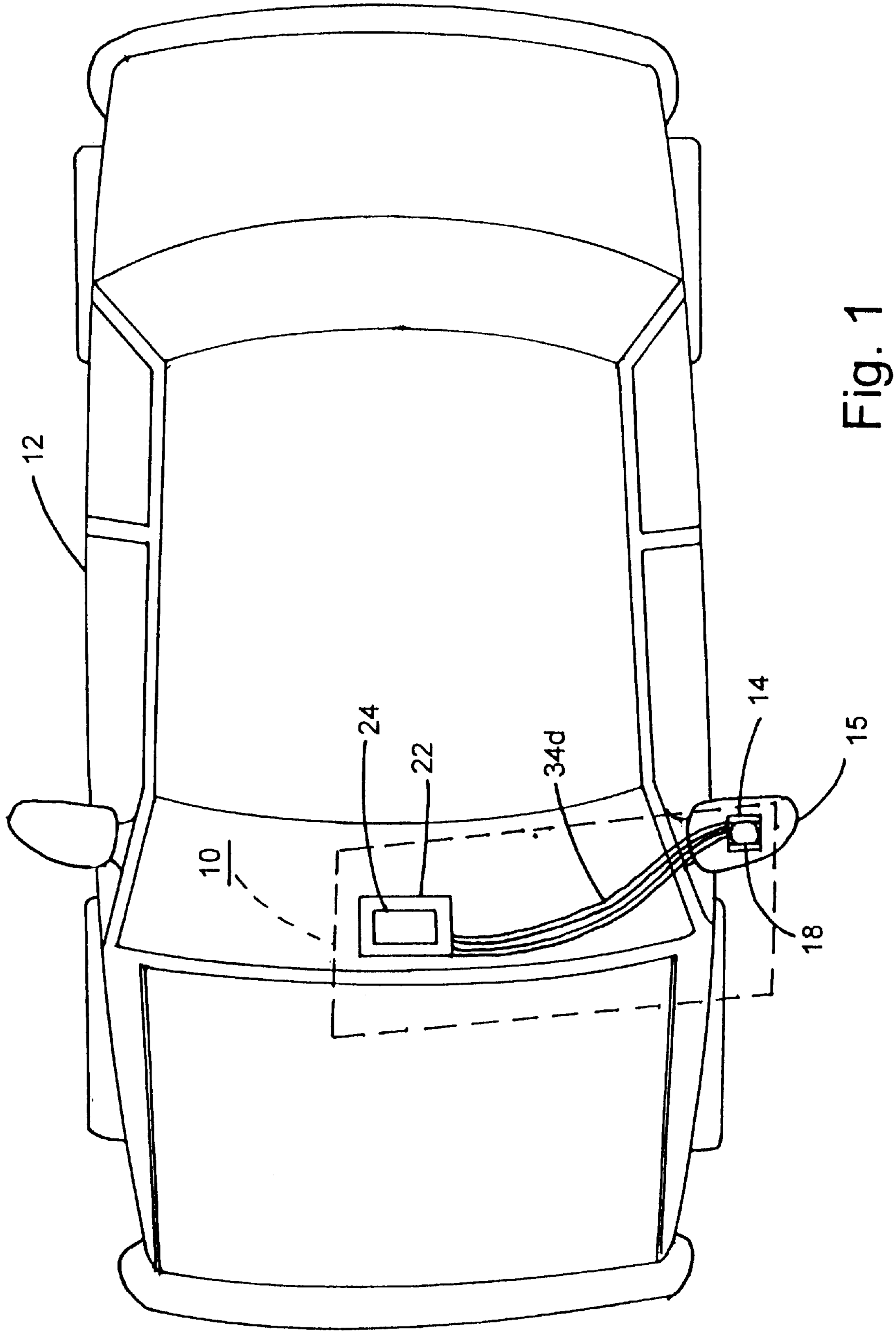
FIG. 1 is a top plan view of a vehicle incorporating a vehicle global positioning system, according to the invention.
Figure 2:
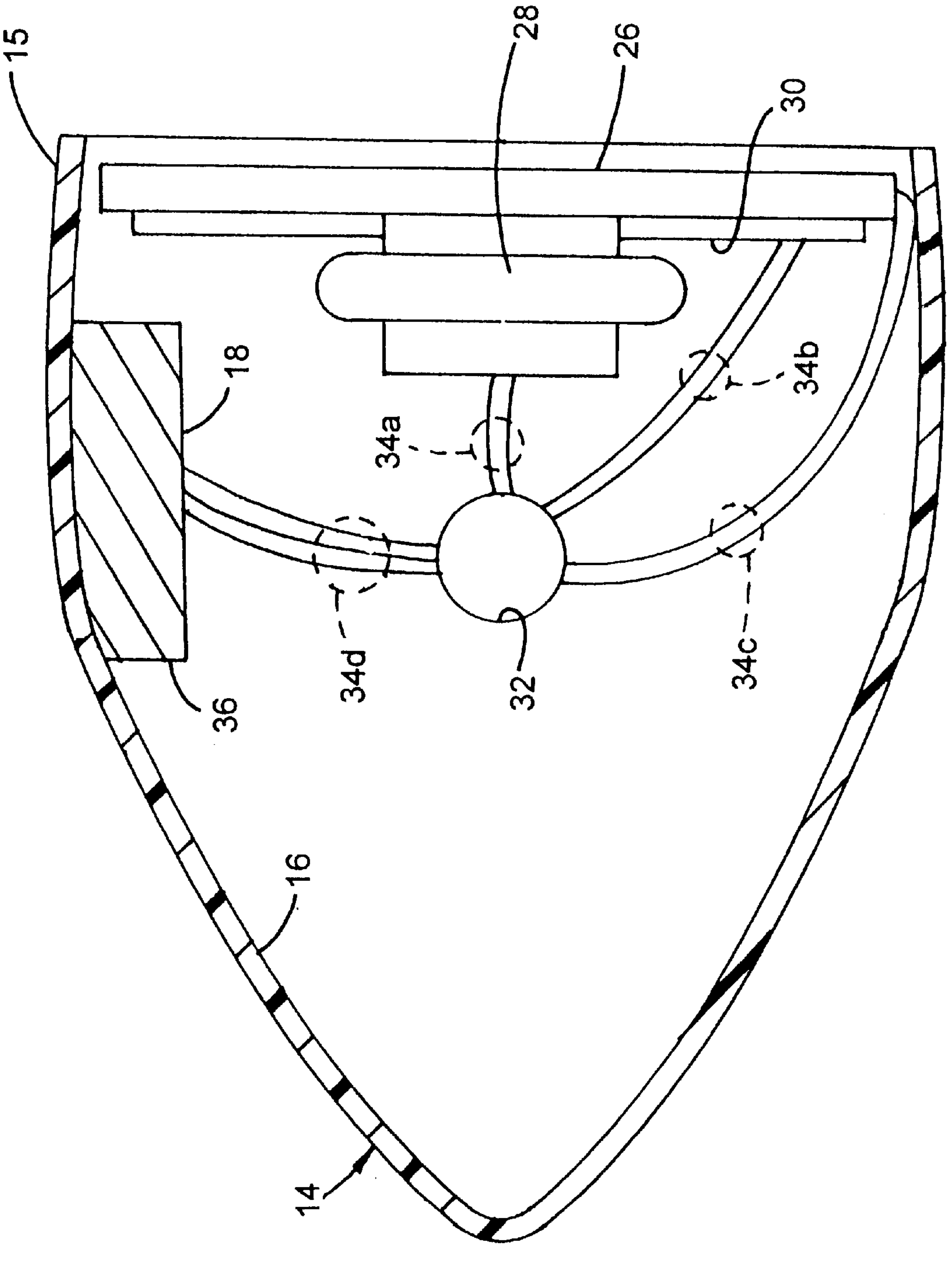
FIG. 2 is a sectional side view of a mirror assembly incorporating a vehicle global positioning system receiving antenna.

Referring now specifically to the drawings and the illustrative embodiments depicted therein, a vehicle global positioning system 10 in a vehicle 12 includes a mirror assembly 14, which is a driver side exterior mirror, including a housing 15 having an outer wall 16 made of a material that is substantially electrically non-conducting and an antenna 18 positioned within the housing. In the illustrated embodiment, housing 16 is made from a polymeric material such as ASA (acrylonitrile/styrene/acrylate) marketed under the mark Luran S by BASF Corporation of Parsippany, N.J.; or under the mark Centrex by Monsanto Polymer Products Corporation of St. Louis, Mo.; or nylon 66 marketed under the mark Vydyne R-400G by Monsanto; or any other suitable polymeric materials. Antenna 18 is a receiving antenna of a vehicle global positioning system 10 which also includes a global positioning system receiver and control module 22 which, in the illustrative embodiment, incorporates a display screen 24. It should be understood that the presence or absence of a display screen is a function of the particular application of the vehicle global positioning system. In vehicle global positioning system applications that supply information to the driver, such as automatic navigation systems, a display screen 24 would typically be provided. In other applications that supply location information to a remote site, such as vehicle position and movement tracking, and road tolling and traffic flow assessment, a display screen 24 may or may not be provided. Vehicle global positioning system 10 is of the type described in Huntingford, David "Global Positioning Systems—The Whole World in your Hands," published September, 1995, in *Advanced Manufacturing Technology*, Dublin, Ireland, the disclosure of which is hereby incorporated herein by reference.

Mirror assembly 14 farther includes a reflective element 26 which is supported for selective adjustable positioning within housing 14 by a positioning device 28. A heater 30 is provided in heat transfer association with reflective element 26. As disclosed in commonly assigned U.S. patent application Ser. No. 971,676, filed Nov. 4, 1992, by Niall R. Lynam et al. for an ELECTROCHROMIC MIRROR FOR VEHICLES, the disclosure of which is hereby incorporated herein by reference, heater 30 may be provided for the purpose of both removing dew and ice from reflective element 26 as well as improving the performance of an electro-optic reflective element, such as an electrochromic reflective element by evenly heating the entire reflective surface to a uniform temperature. Reflective element 26 is preferably an electrochromic mirror element which may be either of the electrochemichrornic type, such as that disclosed in U.S. Pat. No. 5,140,455 issued to Varaprasad et al. and commonly assigned with the present application, the disclosure of which is hereby incorporated herein by reference, or may be of the solid-state type, such as that disclosed in U.S. Pat. No. 4,712,879 issued to Niall R. Lynam et al., U.S. patent application Ser. No. 08/023,675 filed Feb. 22, 1993, by Varaprasad et al., U.S. patent application Ser. No. 08/193,557 filed Feb. 8, 1994, by Varaprasad et al., and U.S. patent application Ser. No. 08/238,521 filed Mar. 5, 1994, U.S. Pat. No. 5,668,663 by Varaprasad et al., all commonly assigned with the present application and as disclosed in U.S. Pat. No. 4,671,619 issued to Kammiori et al., the disclosures of which are hereby incorporated herein by reference. Such electrochromic mirror elements are continuously variable and exhibit multiple partial reflectance states as the voltage applied thereto is varied. Alternately, the reflective element can be a conventional mirror, such as a chrome-coated mirror, or similarly metal reflector coated substrate. Also, the reflective element can comprise a flat mirror, a convex mirror, or a multi-radius mirror, such as an aspheric mirror.

In the illustrated embodiment, positioning device 28 is a conventional electrically operated actuator capable of remotely positioning reflectance element 26 independently about both a vertical axis and a horizontal axis. Such actuators are well known in the art and may include a jackscrew-type actuator, such as Model No. H16-49-8001 (right-hand mirror) and Model No. H16-49-8051 (left-hand mirror) by Matsuyama of Kawagoe City, Japan, or may be a planetary-gear selector such as Model No. 54 (U.S. Pat. No. 4,281,899) sold by Industrie Koot BV (IKU) of Montfort, Netherlands. Such actuator may be remotely operated utilizing a joystick, or the like, by the driver in order to remotely position reflective element 26 in order to provide the desired view rearwardly of the vehicle.

A wireway 32 is provided between vehicle 12 and housing 14 in order to provide passage of electrical leads **34*a* supplying electrical signals and/or power to positioning device 28 and electrical leads 34*b* supplying electrical power to heater 30. For electro-optic reflective elements 26, such as electrochromic reflective elements, electrical leads 34*c* supply low voltage signals in order to color the reflective element to a desired partial reflectance level. Electrical leads 34*d* interconnect global positioning system antenna 18 with global positioning system control module 22. Alternatively, global positioning system control module 22 may be positioned within mirror housing 14 in which case leads 34*d* may supply power to global positioning system control module 22 and display signals between module 22 and display screen 24**, if provided.

Figure 3:
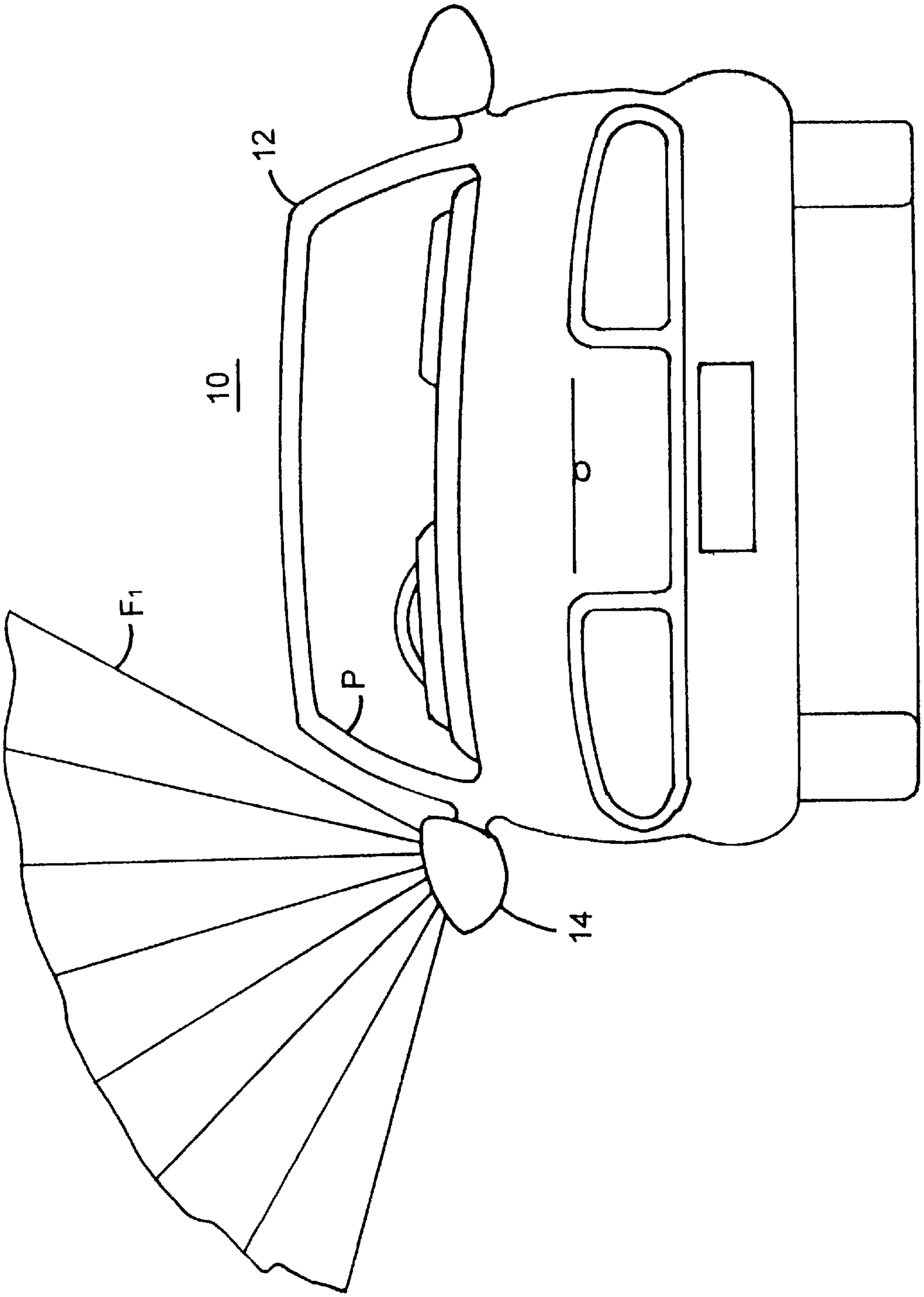
FIG. 3 is a rear elevation of the vehicle in FIG. 1 illustrating the clear line of sight of the receiving antenna.
Figure 4:
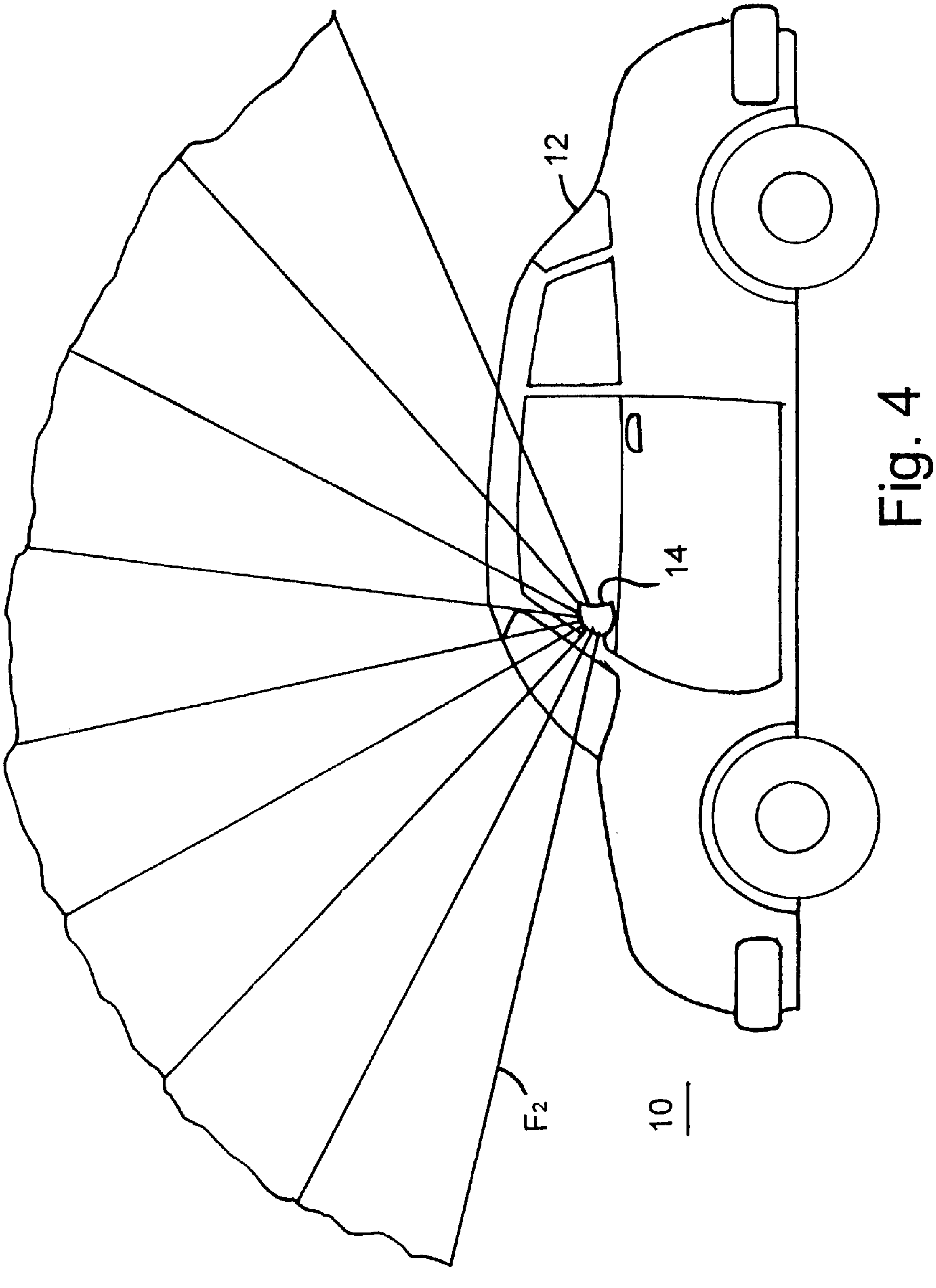
FIG. 4 is a side elevation of the vehicle in FIG. 1 illustrating the clear line of sight of the receiving antenna from a different direction.
Figure 5:
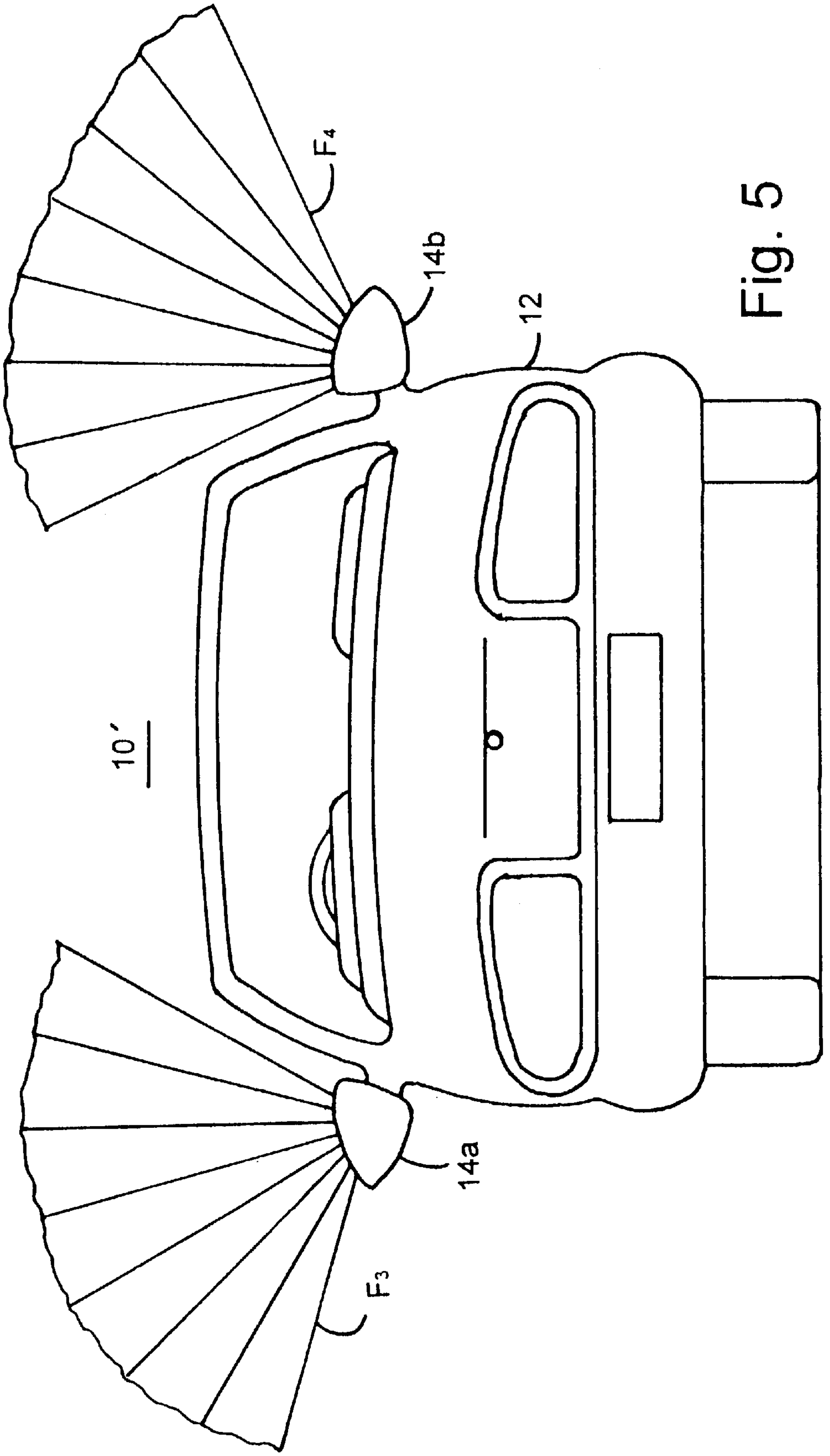
FIG. 5 is a rear elevation of an alternative embodiment of a vehicle global positioning system, according to the invention, incorporating receiving antennas in two exterior mirror assemblies.

As best seen by reference to FIGS. 3 and 4, antenna 18 has a field of view $F_1$ in a lateral direction of the vehicle, which extends from the horizontal to the roof pillar P of the vehicle 12 (FIG. 3). Antenna 18 further has a field of view $F_2$ in a longitudinal direction which is substantially unobstructed by any portion of the vehicle (FIG. 4). With this field of view, vehicle global positioning system 10 is capable of receiving signals from a sufficient number of satellites, under most operating conditions, to provide satisfactory performance in establishing the location of vehicle 12. In an alternative embodiment, a vehicle global positioning system 10' includes a first mirror assembly 14*a* which is a driver's side exterior mirror and a second mirror assembly 14*b*, which is a passenger side exterior mirror (FIG. 5). Each mirror assembly 14*a*, 14*b* includes a global positioning system receiving antenna 18. This configuration provides an overlapping field of view between a lateral field of view $F_3$ of the receiving antenna in mirror assembly 14*a* and the lateral field of view $F_4$ of the global positioning system antenna 18 in mirror assembly 14*b*. Thereby, the field of view of vehicle global positioning system 10' is essentially hemispheric in the vehicle's lateral direction as well as in the longitudinal direction. In this manner, vehicle global positioning system 10' has a clear field of view to essentially all global positioning system earth satellites that are available to vehicle 12.

In the illustrated embodiment, global positioning system antenna 18 is encased within an encasement 36. Encasement 36 may be a separate housing within which the antenna is positioned. Alternatively, the antenna may be integrally molded with outer wall 16 of mirror housing 15 by injection molding, compression molding, reaction injection molding, potting or other conventional molding techniques. Antenna 18 could be packaged as a detachable serviceable assembly in order to provide replacement upon failure of the antenna.

Vehicles often include a data bus scheme to route communications between vehicle devices. Leads 34 interconnecting global positioning system antenna 18 with global positioning system control module 22 could utilize multiplex signals on such vehicle data bus.

Although the vehicle global positioning system is disclosed herein in combination with an exterior mirror assembly, global positioning system antenna 18 could additionally be positioned within an interior mirror of the vehicle. Although positioned within the passenger compartment of the vehicle, which is partially surrounded by electrically conductive metal, the interior mirror has a field of view forward and upward of the vehicle through the windshield that is unobstructed by such conductive metal. The interior mirror assembly global positioning system receiving antenna is capable of receiving signals from global positioning system earth satellites. Such embodiment is not as preferred as previously disclosed embodiments because application to vehicle windshields of a metallic coating, such as a thin metal film of silver or the like, for a defrosting heater or for a solar control film is becoming more common. Such coating could interfere with the operation of the interior mirror assembly global positioning system receiving antenna. Furthermore, the interior mirror casing is movable with respect to the passenger compartment for adjustment to the individual driver's needs. This may introduce error in the vehicle global positioning system measurements. However, such interior mirror assembly mounted receiving antenna may be satisfactory for particular applications. It may also be possible to combine global positioning system antennas in both an interior mirror assembly and exterior mirror assembly in order to yet further increase the performance of the global positioning system receiver.

Exterior mirror assembly mounted receiving antennas are most preferred because the placement of the global positioning system antenna outside the metallic cage of the vehicle provides an unobstructed field of view, especially when two exterior mirrors, on opposite sides of the vehicle, are utilized. The exterior mirror housing is fixed to the vehicle body and includes sufficient volume to readily accommodate the antenna. The mirror housing shields the global positioning system antenna from environmental elements, such as precipitation, dirt, and the like, and hides the antenna from view. Furthermore, essentially every vehicle has at least one exterior mirror providing an ability to widely apply the invention through the vehicle industry.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicle global positioning system in a vehicle having a metallic body, comprising:

a first exterior mirror assembly including a first reflective element and a first housing for said reflective element, said first reflective element moveably mounted with respect to said first housing by a first positioning device, said fist housing made from a material that is substanially electrically non-conducting, said first housing forming a cavity, said cavity being open at one end and closed at an opposing end, said first reflective element positioned at said open end;

a global positioning system receiver including a first receiving antenna fixedly mounted with respect to said first housing separate from said first reflective element, said first receiving antenna located within said cavity at a position between said first reflective element and said opposing end, said global positioning system receiver adapted to receive earth satellite signals from a plurality of global positioning satellites with said first receiving antenna and convert said signals to at least one of location, velocity and time parameters; and wherein said first receiving antenna is positioned with said housing outside of the vehicle's body thereby avoiding the cage effect of the vehicle body.

2. The system in claim 1 including a casing for said first antenna that is fixedly mounted with respect to said housing.

3. The system in claim 2 wherein said casing is attached to said first housing.

4. The system in claim 1 wherein said first antenna is integrally formed with said first housing.

5. The system in claim 4 wherein said first antenna is integrally formed with said first housing by one of injection molding, compression molding, reaction injection molding and potting.

6. The system in claim 1 wherein said first antenna is removable from said first housing for service or replacement.

7. The system in claim 1 wherein said first exterior mirror assembly is a driver side mirror.

8. The system in claim 1 wherein said first exterior mirror assembly is a passenger side mirror.

9. The system in claim 1 including a second exterior mirror assembly having a second reflective element and a second housing for said second reflective element, said second housing made from a material that is substantially electrically non-conducting; and wherein said global positioning system receiver includes a second receiving antenna, wherein said second receiving antenna is positioned within said second housing.

10. The system in claim 9 wherein said first and second exterior mirror assemblies are mounted on opposite sides of the vehicle.

11. The system in claim 10 wherein said first mirror assembly is a driver side mirror and wherein said second mirror assembly is a passenger side mirror.

12. The system in claim 11 including a third mirror assembly having a third reflective element and a third housing for said third reflective element, said third housing made from a material that is substantially electrically non-conducting; and wherein said global positioning system receiver includes a third receiving antenna, wherein said third receiving antenna is positioned within said third housing.

13. The system in claim 12 wherein said first and second mirror assemblies are exterior mirrors and said third mirror assembly is an interior mirror.

14. A vehicle global positioning system in a vehicle having a metallic body, comprising:

an exterior mirror assembly including a reflective element, a housing for said reflective element, a heater in heat transfer association with said reflective element, a motorized positioning device for selectively positioning said reflective element in said housing and electrical leads extending through a wireway to said housing for supplying electrical current to at least said heater and said positioning device, wherein said housing is made from a material that is electrically substantially non-conducting, said housing forming a cavity, said cavity being open at one end and closed at an opposing, end said reflective element positioned at said open end;

a global positioning system receiver including a receiving antenna fixedly mounted with respect to said housing separate from said first reflective element and electrical leads, said receiving antenna located within said cavity at a position between said reflective element and said opposing end, said global positioning system receiver adapted to receive earth satellite signals from a plurality of global positioning satellites with said receiving antenna, and convert said signals to at least one of location, velocity and time parameters; and wherein said receiving antenna is positioned within said housing outside of the vehicle's body thereby avoiding the cage effect of the vehicle body and said electrical leads of said global position system extend through said wireway.

15. The system in claim 14 including a casing for said antenna that is fixedly mounted with respect to said housing.

16. The system in claim 15 wherein said casing is removably attached to said housing wherein said antenna can be removed for service or replacement.

17. The system in claim 14 wherein said antenna is integrally formed with said housing.

18. The system in claim 17 wherein said antenna is integrally formed with said housing by one of injection molding, compression molding, reaction injection molding and potting.

19. The system in claim 14 wherein said reflective element is an electro-optic device, wherein said electrical leads supply an electrical signal to establish a partial reflectance level of said reflective element.

20. The system in claim 19 wherein said reflective element is an electrochromic mirror element.

21. The system in claim 14 wherein said electrical leads of said global positioning system connect with a vehicle data bus.

22. A vehicle global positioning system in a vehicle having a metallic body, comprising:

a driver side exterior mirror assembly including a first reflective element and a first housing for said first reflective element, said first reflective element movably mounted with respect to said first housing by a first positioning device, wherein said first housing is made from a material that is substantially electrically non-conducting, said first housing forming a first cavity, said first cavity being open at one end and closed at an opposing end, said first reflective element positioned at said open end of said first cavity;

a passenger side exterior mirror assembly including a second reflective element and a second housing for said second reflective element, said second reflective element movably mounted with respect to said second housing by a second positioning device, wherein said second housing is made from a material that is substantially electrically non-conducting, said second housing forming a second cavity, said second cavity being open at one end and closed at an opposing end, said second reflective element positioned at said open end of said second cavity;

a global positioning system receiver including first and second receiving antennas, said global positioning system receiver adapted to receive earth satellite signals from a plurality of global positioning satellites with said receiving antennas and convert said signals to at least one of location, velocity and time parameters;

wherein said first receiving antenna is fixedly mounted with respect to said first housing separate from said first reflective element, said first receiving antenna located within said first cavity at a position between said first reflective element and the opposing end of said first cavity, and said second receiving antenna is fixedly mounted with respect to said second housing separate from said second reflective element, said second receiving antenna located within said second cavity at a position between said second reflective element and the opposing end of said second cavity wherein said first and second receiving antennas are outside of the vehicle's body thereby avoiding the cage effect of the vehicle's body.

23. The system in claim 22 including a casing for each said antenna that is fixedly mounted with respect to the associated housing.

24. The system in claim 23 wherein said casing is removably attached to the associated housing wherein said antenna can be removed for service or replacement.

25. The system in claim 22 wherein each said antenna is integrally formed with the associated housing.

26. The system in claim 25 wherein each said antenna is integrally formed with the associated housing by one of injection molding, compression molding, reaction injection molding and potting.

27. The system in claim 22 wherein each said reflective element is an electrochromic mirror element.

* * * * *

UNITED STATES PATENT AND TRADEMARK OFFICE

CERTIFICATE OF CORRECTION

PATENT NO. : 5,971,552 Page 1 of 1
DATED : October 26, 1999
INVENTOR(S) : Desmond J. O'Farrell, Roger L. Veldman and Kenneth Schofield It is certified that error appears in the above-identified patent and that said Letters Patent is hereby corrected as shown below:

Column 3,
Line 59, "farther" should be -- further --.

Column 4,
Line 7, "electrochemichrornic" should be -- electrochemichromic --.

Column 6, claim 1,
Line 19, "fist" should be -- first --.
Line 20, "substanially" should be -- substantially --.
Line 34, "with" should be -- within --.

Column 7, claim 14,
Line 24, delete -- , -- after "opposing".
Line 25, insert --, -- after "end" in the first occurrence.
Line 39, "position" should be -- positioning --.

Column 8, claim 22,
Line 40, insert -- , -- after "cavity"

Signed and Sealed this

Eighth Day of January, 2002

*Attest:*

JAMES E. ROGAN

*Attesting Officer* *Director of the United States Patent and Trademark Office*